United States Patent [19]

Yoshida

[11] 4,351,515

[45] Sep. 28, 1982

[54] FEEDBACK CONTROL TYPE SHOCK ABSORBING SUSPENSION SYSTEM

[75] Inventor: Akio Yoshida, Toyota, Japan

[73] Assignee: Toyota Jidosha Kogyo Kabushiki Kaisha, Toyota, Japan

[21] Appl. No.: 159,518

[22] Filed: Jun. 16, 1980

[30] Foreign Application Priority Data

Jul. 2, 1979 [JP] Japan .................................. 54-82566

[51] Int. Cl.³ ...................... F16F 13/00; F16F 15/03
[52] U.S. Cl. .................................. 267/8 R; 188/267;
188/380; 248/562; 267/136
[58] Field of Search ............... 188/1 B, 267, 298, 378,
188/379, 380; 267/8 R, 134, 136, 182; 248/562,
563, 636

[56] References Cited

U.S. PATENT DOCUMENTS

| | | | |
|---|---|---|---|
| 2,973,969 | 3/1961 | Thall | 188/267 X |
| 3,059,915 | 10/1962 | Kemelhor | 188/267 X |
| 3,084,009 | 4/1963 | Heym | 188/1 B X |
| 3,243,013 | 3/1966 | Molin et al. | 335/255 X |
| 3,509,742 | 5/1970 | Bauer | 267/136 X |
| 3,840,097 | 10/1974 | Holley | 188/287 |
| 4,093,177 | 6/1978 | Morris | 188/298 X |
| 4,127,835 | 11/1978 | Knutson | 335/255 X |
| 4,131,866 | 12/1978 | Torr | 335/255 X |

Primary Examiner—George E. A. Halvosa
Attorney, Agent, or Firm—Kenyon & Kenyon

[57] ABSTRACT

A feedback control type shock absorbing suspension system is inserted between a body including a vibration source and a foundation for suspension of the body. The absorbing system includes a suspending spring mechanism. A sensor mechanism detects velocity of relative movement between the body and the foundation. A cylinder-piston mechanism includes a cylinder connected to one of the body and the foundation and a piston connected to the other of the body and the foundation. Magnetic fluid or powder is held between the inner wall of the cylinder and the outer wall of the piston. An exciting coil generates magnetic flux for magnetizing the magnetic fluid or powder. An electric circuit applies to the exciting coil a control voltage which corresponds to the detected value of the sensor mechanism. The vibration-damping force between the cylinder and the piston is controlled by magnetizing the magnetic fluid or powder.

8 Claims, 13 Drawing Figures

FEEDBACK CONTROL TYPE SHOCK ABSORBING SUSPENSION SYSTEM

FIELD OF THE INVENTION

The present invention relates to a shock absorbing suspension system to be inserted between a body including a vibration source and a foundation for suspension of this body. More particularly, the present invention relates to a shock absorbing suspension system in which the relative speed between the body and the foundation is detected and a magnetic flux is generated according to the detected value to effect feedback control of the vibration-suppressing force between the body and the foundation.

THE PRIOR ART

Ordinarily, shock absorbing mechanisms including a rubber vibration isolator are attached to mounts of not only automobile engines but also other machines. However, a shock absorbing mechanism of this type shows a resonance phenomenon at a characteristic frequency determined by the mass of the engine or machine and the dynamic spring constant of the rubber vibration insulator. In the case of an engine mount, if the dynamic spring constant of the rubber vibration isolator is set at a low level, a large amplitude is produced in a relatively low frequency region by the resonance phenomenon, causing various problems concerning shock absorption and strength. In contrast, if the dynamic spring constant is set at a high level, occurrence of a large amplitude at the resonance point can be prevented, but the shock absorbing capacity of the rubber vibration isolator is reduced at frequencies exceeding the resonance point. Thus, either one or the other of the above-mentioned defects is brought about in a shock absorbing mechanism including a rubber vibration isolator, whatever the adjustment the dynamic spring constant may be.

SUMMARY OF THE INVENTION

It is therefore a primary object of the present invention to provide a shock absorbing suspension system in which the above-mentioned contradictory problems can be effectively solved.

Another object of the present invention is to provide a shock absorbing suspension system in which a relative speed between a body including a vibration source, such as an engine or other body, and a foundation for suspension of the body is detected and a magnetic flux is produced in a magnetic fluid according to the detected value to effect feedback control of the vibration-suppressing force between the body and the foundation.

In accordance with the present invention, these objects can be attained by a feedback control type shock absorbing suspension system to be inserted between a body including a vibration source and a foundation for suspension of said body, which comprises a suspending spring mechanism interposed between said body and said foundation, a sensor mechanism for detecting a relative speed between said body and said foundation, a cylinderpiston mechanism including a cylinder connected to either said body or said foundation and a piston connected to the other of said body or said foundation, a magnetic fluid or powder being held between the outer wall face of the piston and the inner wall face of the cylinder, an exciting coil for generating a magnetic flux magnetizing said magnetic fluid or powder, and an electric circuit for applying a control voltage corresponding to the value detected by said sensor mechanism to said exciting coil, wherein the vibration-suppressing force between the cylinder and the piston is controlled by magnetization of said magnetic fluid or powder.

According to the present invention, the vibration transmission rate characteristic can be changed in a very broad range by appropriately setting characteristics of the damping force control system, and therefore, a damping characteristic very close to an optimum damping characteristic can be realized according to the intended object of a particular application.

Needless to say, the system of the present invention providing such effects can be widely used as the shock absorbing suspension system for vibration-insulating mounts of not only automobile engines but also other internal combustion engines and other various machines and bodies including vibration-producing sources therein.

DESCRIPTION OF THE DRAWINGS

Embodiments of the present invention will now be described in detail with reference to the accompanying drawings.

DESCRIPTION OF THE PREFERRED EMBODIMENTS

Figure 1:
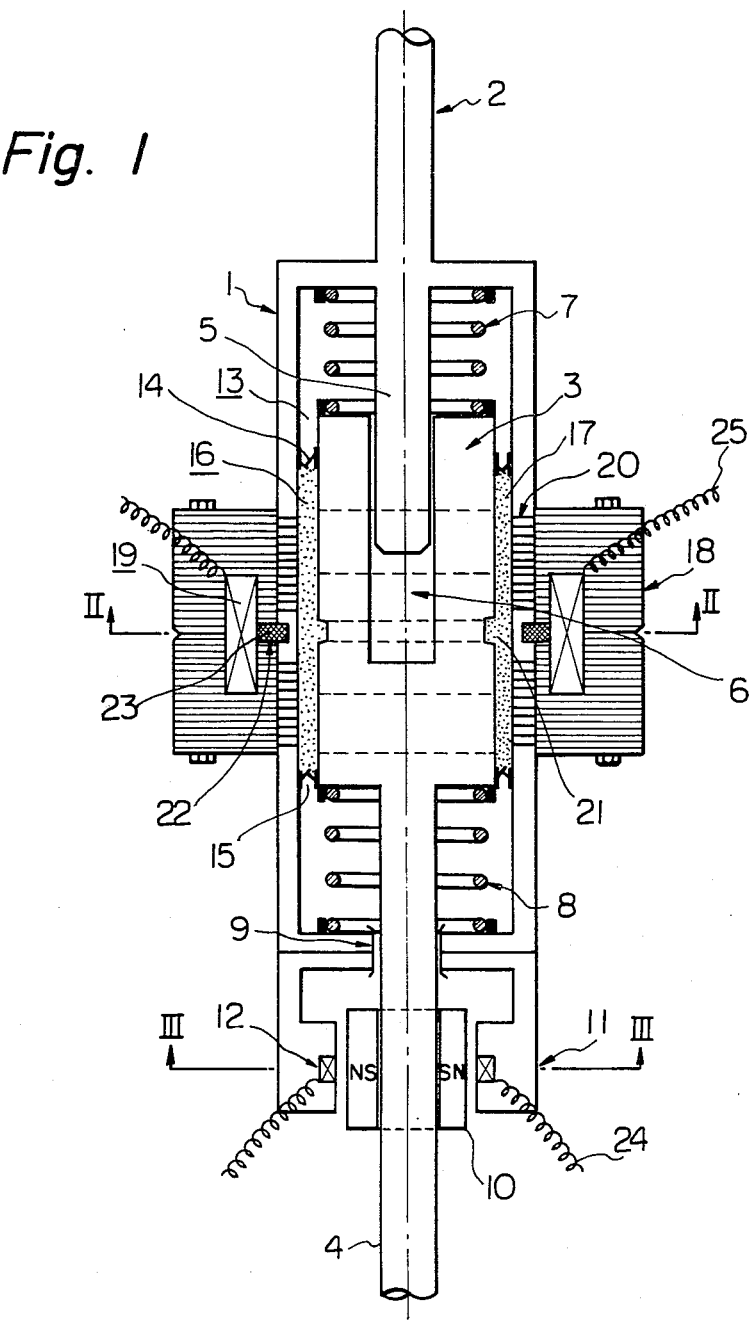
FIG. 1 is a longitudinal sectional view of one preferred embodiment of the shock absorbing suspension system according to the present invention.
Figure 2:
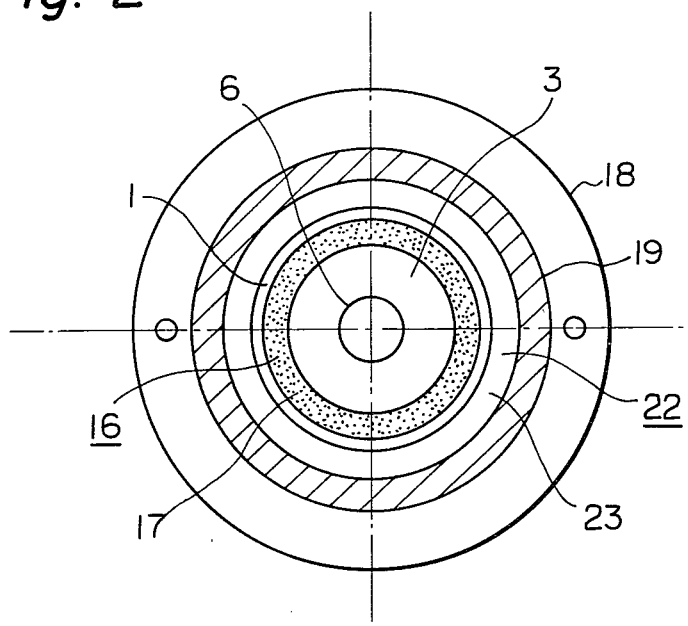
FIG. 2 is a view illustrating the section taken along line II—II in FIG. 1.
Figure 3:
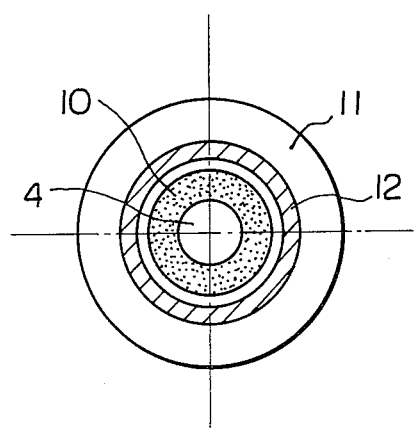
FIG. 3 is a view illustrating the section taken along line III—III in FIG. 1.

FIGS. 1 through 3 illustrate one embodiment of the shock absorbing suspension system of the present invention, which is inserted between a body including a vibration source (for example, an automobile engine) and a foundation for suspension of this body (for example, a chassis of an automobile). A connecting rod 2 extending above a cylinder 1 is connected to the engine side (not shown), and a connecting rod 4 extending downward from a piston 3 arranged in the cylinder 1 is connected to the chassis (not shown). The cylinder 1 has a guide rod 5 extending downward from the top end of the inner wall thereof along the central axis thereof, and the piston 3 has a guide slot 6 extending downward from the top end thereof along the central axis thereof. The guide rod 5 and guide slot 6 have a telescopic relation to each other, and the piston 3 is allowed to slide vertically in the cylinder 1 along the guide rod 5. Compression coil springs 7 and 8 are disposed between the upper end of the inner wall of the cylinder 1 and the top end of the piston 3 and between the lower end of the inner wall of the cylinder 1 and the lower end of the piston 3, respectively.

The connecting rod 4 extending downward from the piston 3 is vertically slidably supported by a guide bush 9 (plain bearing) mounted on the lower end of the cylinder 1, and an annular magnet 10 is attached below the guide bush 9. An annular yoke member 11 extends downward from the end of the cylinder 1, and a coil 12 is mounted on the inner circumferential wall of the yoke member 11 adjacently to the annular magnet 10.

A certain space 13 is left between the inner cylindrical wall face of the cylinder 1 and the outer wall face of the piston 3, and annular seal members 14 and 15 are arranged in the vicinity of the upper and lower ends of the space 13, respectively. Thus, an annular sealed chamber 16 is formed and defined by the annular seal members 14 and 15, the cylinder 1 and the piston 3. A magnetic fluid or powder 17 containing magnetic particles is filled in the interior of this annular sealed chamber 16. A magnetic core 18 is arranged on the periphery of the cylinder 1 outside the sealed annular chamber 16 in close proximity to the periphery of the cylinder 1, and an exciting coil 19 for producing a magnetic flux in the magnetic fluid or powder 17 is disposed in the interior of the magnetic core 18. A plurality of fine holes 20 extending radially and communicating with the annular sealed chamber 16 are formed on the wall of the cylinder 1 in the portion surrounded by the magnetic core 18, so that the magnetic fluid or powder 17 is allowed to flow between the annular sealed chamber 16 and fine holes 20. An annular magnetic flux guide groove 21 depressed into the piston 3 and extending in the circumferential direction is formed on the periphery of the piston 3 in the vicinity of the central portion of the annular sealed chamber 16. An annular groove 22 is formed on the inner side of the magnetic core 18 and a part of the cylinder 1 in the vicinity of the central portion of the annular exciting coil 19, and a non-magnetic material 23 for intercepting the magnetic flux is packed in this groove 22.

A force causing a relative displacement between the engine and the chassis for suspension of the engine occurs at starts or stops of the engine, sudden accelerations or engine braking. This relative displacement is transmitted to the cylinder 1 and piston 3 through the connecting rods 2 and 4 and is further transmitted to the annular magnet 10 attached to the connecting rod 4 and the coil 12 attached to the yoke member 11, whereby relative displacements are similarly caused between the cylinder 1 and piston 3 and between the annular magnet 10 and coil 12, respectively. Accordingly, a voltage proportional to the relative speed is produced in the coil 12.

Figure 4:
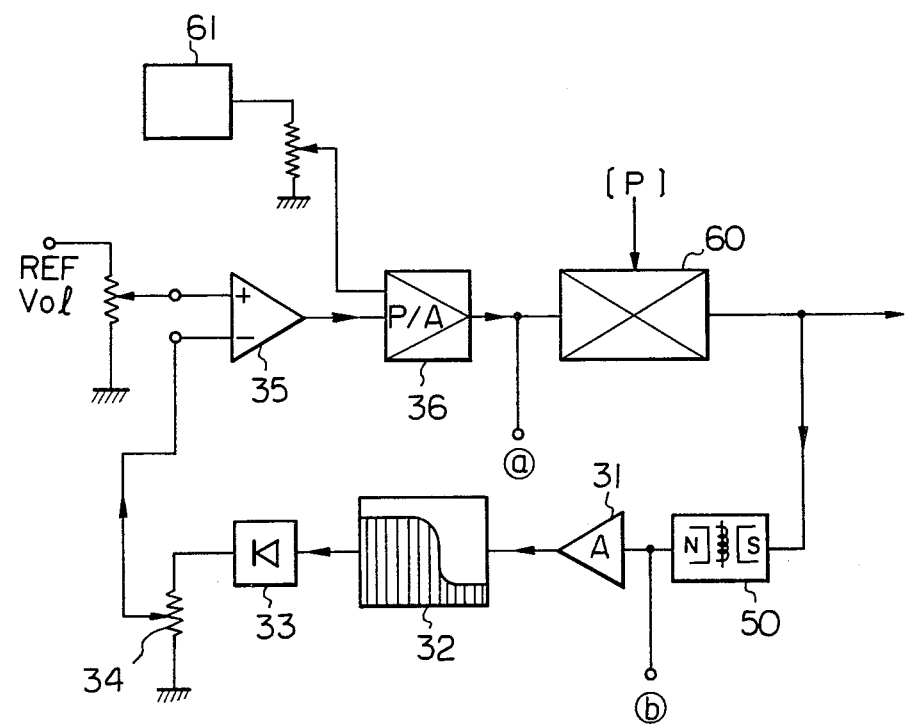
FIG. 4 is a block circuit diagram illustrating the operation principle of the feedback control in the shock absorbing suspension system according to the present invention.
Figure 5:
FIGS. 5 through 8 are conceptual diagrams showing wave forms of the main parts illustrated in the block circuit diagram of FIG. 4 during the operation of the shock absorbing suspension system according to the present invention.

This voltage is applied to point (b) of an electric control circuit illustrated in FIG. 4 through a lead-in line 24 illustrated in FIG. 1. An example of the wave form of the voltage is shown in FIG. 5.

Figure 6:
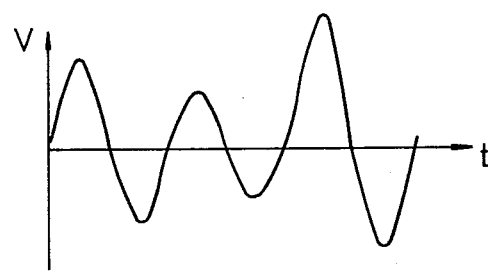
Figure 7:
Figure 8:

In the control block circuit diagram illustrated in FIG. 4, the voltage applied to point (b) is supplied to a low-pass filter 32 through an amplifier 31 to produce a voltage having a smoothed wave form shown in FIG. 6. This smoothed voltage is then applied to a rectifying integrator 33. The wave form of the output of the rectifier is as shown in FIG. 7, and the wave form of the output from the integrator is as shown in FIG. 8. The output from the rectifying integrator 33 is connected to a servo amplifier 35 through a variable resistance 34 and is compared with a reference voltage (REF VOL); the amplified difference from the output of the servo amplifier 35 is supplied to the point (a) through a power amplifier 36.

Since this point (a) is connected to the exciting coil 19 through a lead-in line 25 in FIG. 1, a magnetic flux which has an intensity having a certain relation to the relative speed between the engine proper and the chassis is produced around the exciting coil 19. The magnetic fluid 17 is magnetized by this magnetic flux, and a controlling force (vibration-suppressing force) is produced to control the relative speed between the cylinder 1 and the piston 3. By this controlling force, the relative speed between the engine proper and the chassis is abruptly reduced. If the relative speed is thus reduced, the voltage produced in the coil 12 is simultaneously reduced, and also the intensity of the electromagnetic controlling force is reduced along the above-mentioned course.

The intensity of the controlling force acting on the shock absorbing suspension system with respect to the amplitude of the relative velocity between the engine proper and the chassis can be set at a predetermined level by the gains of the respective elements illustrated in the block circuit diagram of FIG. 4 and the level setter 34 (variable resistance).

Furthermore, if the frequency characteristics of the low-pass filter 32 are appropriately selected, it becomes possible to produce a sufficient vibration-suppressing force in response to an external disturbing force of a relatively low frequency and to freely control an electromagnetic braking force to a vibrating force of a relatively high frequency produced by the engine.

In FIG. 4, reference numeral 50 represents a mechanism for detecting the relative speed, and reference numeral 60 generally represents the shock absorbing suspension system to which an external disturbing force P (vibration) is applied. Reference numeral 61 represents a dither circuit.

Advantages of the feedback control type shock absorbing suspension system of the present invention, which has been described with reference to the above embodiment, are as follows.

(1) Since a suspending coil spring element and a magnetic particle type damper element by which a damping action is exerted proportional to the relative velocity are disposed in the body portion of the shock absorbing apparatus, the entire structure of the suspension system can be constructed by these members alone.

(2) Since a sensor for detecting the relative speed is disposed in the body portion of the shock absorbing apparatus, the feedback quantity can be taken out directly from the object to be controlled.

(3) In an engine mount of the rubber vibration isolator type, which is ordinarily used, dynamic properties of the rubber vibration isolator are considerably influenced by the ambient temperature, and the temperature dependency of these properties raises problems in practical application. In the present invention, this temperature dependency is not observed at all and good characteristics can be maintained irrespective of temperature changes.

(4) In the present invention, since a filter having an optional frequency characteristic (low-pass filter 32) is used in the detecting zone of the control apparatus, the frequency characteristic of the quantity to be controlled can be freely chosen according to the requirement of the design.

(5) In an ordinary engine mount system, the damping force in response to vibration of a relatively low frequency is often insufficient, but the damping force in response to vibrations of a relatively high frequency is often excessive. According to the present invention, these contradictory defects can be effectively eliminated by appropriately setting characteristics of the elements connected to the feedback loop illustrated in FIG. 4.

FIGS. 9 through 13 illustrate embodiments in which the shock absorbing suspension system of the present invention is used for suspending an automobile engine. In these Figures, reference numeral 70 represents an engine proper, reference numeral 71 represents a chassis of an automobile and reference numeral 72 represents a rubber vibration isolator.

Figure 9:
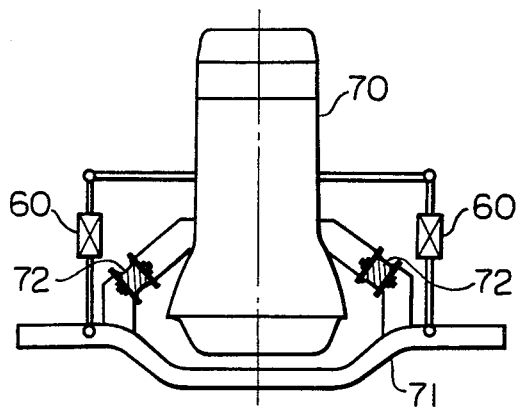
FIGS. 9 through 13 illustrate embodiments in which the shock absorbing suspension system according to the present invention is applied to the suspension system of an automobile engine.

FIG. 9 illustrates an embodiment in which two sets of the shock absorbing suspension system 60 according to the present invention are arranged on both sides of the engine proper 70 so as to supplement the characteristics of an engine mount of the rubber vibration isolator 72.

Figure 10:
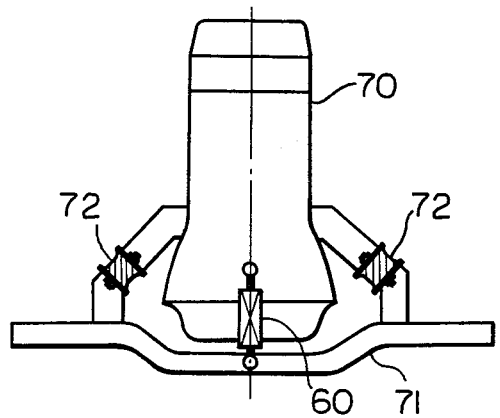

FIG. 10 illustrates an embodiment in which the shock absorbing suspension system according to the present invention is arranged in the vertical plane including the central line of the engine proper 70.

Figure 11:
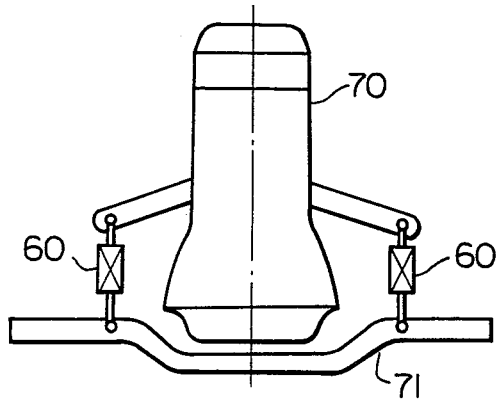

FIG. 11 illustrates an embodiment in which two sets of the shock absorbing suspension system according to the present invention are disposed on both sides of the engine proper 70, but the rubber vibration isolation mount 72 is not used.

Figure 12:
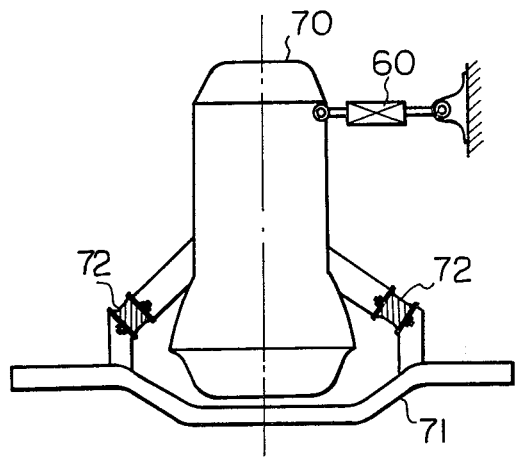

FIG. 12 illustrates an embodiment in which the shock absorbing suspension system according to the present invention is used in combination with a rubber vibration isolation mount 72, and the system of the present invention is arranged to control rolling vibrations (oscillations) of the engine 70.

Figure 13:
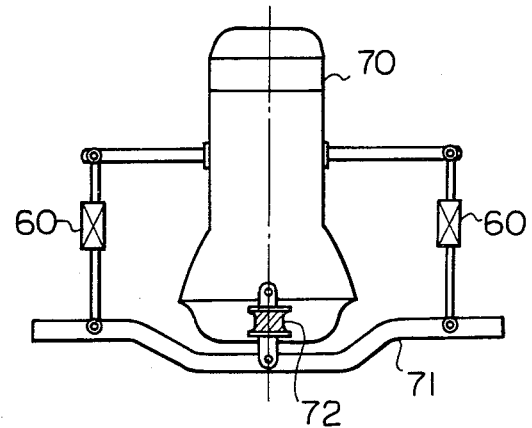

FIG. 13 illustrates an embodiment in which two sets of the shock absorbing suspension system according to the present invention are disposed on both sides of the engine 70, and a rubber vibration isolation mount 72 is arranged in the vertical plane including the central line of the engine to support the stationary load of the engine 70.

The shock absorbing suspension system of the present invention may be utilized not only as an automobile engine suspension system but also for other various purposes, such as those described below.

(1) The shock absorbing suspension system of the present invention can be utilized as a shimmy damper for a steering system of an automobile. In an automobile with an independent suspension system, the shock absorbing suspension system of the present invention is disposed between a tie rod or connecting rod and a chassis and an automobile with a rigid axle system, the suspension system of the present invention is disposed between a tie rod or steering knuckle arm and a chassis, whereby shimmy in the steering system can be controlled. In this case, self-return to the neutral position can be expected during the steering operation.

(2) The shock absorbing suspension system of the present invention can be used as a shock absorber and a suspension spring in the suspension system of an automobile.

(3) The shock absorbing suspension system can be disposed between a cab and a bed in a truck to control abnormal vibrations of the distributor cap during driving.

(4) The shock absorbing suspension system of the present invention can be used as a suspension system for ships, trains, power plants and various vehicles other than automobiles.

I claim:

1. A feedback control type shock absorbing suspension system to be inserted between a body including a vibration source and a foundation for suspension of said body, which system comprises a suspending spring mechanism interposed between said body and said foundation, a sensor mechanism for detecting velocity of relative movement between said body and said foundation, a cylinder-piston mechanism including a cylinder connected to one of said body and said foundation and a piston connected to the other of said body and said foundation, a magnetic fluid or powder being held between the outer wall face of the piston and the inner wall face of the cylinder, an exciting coil for generating a magnetic flux for magnetizing said magnetic fluid or powder, and an electric circuit for applying a control voltage corresponding to the detected value of said sensor mechanism to said exciting coil, wherein at least two annular seal members are arranged in axially spaced relation between the outer wall face of the piston and the inner wall face of the cylinder, the space between said seal members constituting a sealed annular chamber, said chamber being filled with all of the magnetic fluid or powder between the inner wall surfaces of the cylinder, and wherein the vibration-damping force between the cylinder and the piston is controlled by magnetization of said magnetic fluid or powder.

2. A suspension system as set forth in claim 1, wherein the suspending spring mechanism comprises a first compression coil spring disposed between one inner end wall face of the cylinder and one end wall face of the piston and a second compression coil spring disposed between the other inner end wall face of the cylinder and the other end wall face of the piston.

3. A suspension system as set forth in claim 1, wherein the sensor mechanism for detecting velocity of relative movement comprises an annular magnet attached to a rod connected to the piston and a coil attached to the inner circumference of an annular yoke extended from one end of the cylinder, said coil being disposed adjacent to said annular magnet.

4. A suspension system as set forth in claim 1, wherein an annular magnetic core is disposed in close proximity to the periphery of the cylinder outside the sealed annular chamber.

5. A suspension system as set forth in claim 4, wherein the exciting coil for generating a magnetic flux for magnetizing the magnetic fluid is disposed in the interior of the magnetic core.

6. A suspension system as set forth in claim 5, wherein in the central portion of the sealed annular chamber, an annular magnetic flux guide groove is formed on the periphery of the piston in the circumferential direction thereof.

7. A suspension system as set forth in claim 5, wherein a non-magnetic portion for intercepting the magnetic flux is disposed between the sealed annular chamber and the exciting coil.

8. A suspension system as set forth in claim 4, wherein a plurality of fine holes extending in the radial direction and communicating with the sealed annular chamber are formed in the portion of the wall of the cylinder surrounded by the magnetic core.

* * * * *